US009812170B2

(12) United States Patent
Benson

(10) Patent No.: US 9,812,170 B2
(45) Date of Patent: Nov. 7, 2017

(54) METHOD FOR AUTOMATED TELEVISION PRODUCTION

(75) Inventor: John R. Benson, Jacksonville, FL (US)

(73) Assignee: GVBB HOLDINGS S.A.R.L., Luxembourg (LU)

( * ) Notice: Subject to any disclaimer, the term of this patent is extended or adjusted under 35 U.S.C. 154(b) by 0 days.

(21) Appl. No.: 12/736,386

(22) PCT Filed: Dec. 22, 2008

(86) PCT No.: PCT/US2008/013969
§ 371 (c)(1),
(2), (4) Date: Oct. 2, 2010

(87) PCT Pub. No.: WO2009/126129
PCT Pub. Date: Oct. 15, 2009

(65) Prior Publication Data
US 2011/0029099 A1    Feb. 3, 2011

Related U.S. Application Data

(60) Provisional application No. 61/123,914, filed on Apr. 11, 2008.

(51) Int. Cl.
*H04N 7/18* (2006.01)
*G11B 27/034* (2006.01)
(Continued)

(52) U.S. Cl.
CPC ............ *G11B 27/034* (2013.01); *G11B 27/34* (2013.01); *H04H 60/07* (2013.01); *H04N 5/222* (2013.01)

(58) Field of Classification Search
CPC .......... H04N 7/18; H04N 1/183; H04N 5/222; G11B 27/34; H04H 60/07
(Continued)

(56) References Cited

U.S. PATENT DOCUMENTS 5,359,712 A * 10/1994 Cohen et al. ................. 715/723
7,024,677 B1 * 4/2006 Snyder et al. ................. 725/86
(Continued)

FOREIGN PATENT DOCUMENTS

JP           8328644        12/1996
JP         H09-044524        2/1997
(Continued)

OTHER PUBLICATIONS

Holtz: "Grass Valley Ignite Multicast Market Opportunity Technology and System for Live Production & Business Case White Paper," Sep. 18, 2006, Grass Valley, Thomson Grass Valley Integrated Production Solutions, pp. 1-34.
(Continued)

*Primary Examiner* — Tonia L Dollinger
*Assistant Examiner* — Steven Nguyen
(74) *Attorney, Agent, or Firm* — Arent Fox LLP

(57) ABSTRACT

A method for updating a control event for controlling at least one device to produce audio visual content includes the steps of analyzing the control event to establish: (1) parameter(s) corresponding to the control event available for modification; and (2) parameter(s) of other control events influenced upon modification of at least one parameter corresponding to the control event, and modifying the parameter of the control event and other control events influenced thereby in response to user input changing at least one parameter of the control event available information.

53 Claims, 8 Drawing Sheets

(51) Int. Cl.
*G11B 27/34* (2006.01)
*H04H 60/07* (2008.01)
*H04N 5/222* (2006.01)

(58) Field of Classification Search
USPC .......................................................... 348/61
See application file for complete search history.

(56) References Cited

U.S. PATENT DOCUMENTS

| | | | |
|---|---|---|---|
| 7,302,644 B2* | 11/2007 | Holtz et al. .................... | 715/720 |
| 2002/0026514 A1* | 2/2002 | Ellis et al. .................... | 709/227 |
| 2002/0109710 A1* | 8/2002 | Holtz et al. .................... | 345/723 |
| 2004/0008220 A1* | 1/2004 | Snyder .................. | G06F 3/0481 715/716 |
| 2004/0210945 A1* | 10/2004 | Snyder et al. ................. | 725/135 |
| 2005/0223106 A1* | 10/2005 | Ross et al. .................... | 709/231 |
| 2005/0226595 A1* | 10/2005 | Kreifeldt et al. ............... | 386/46 |
| 2005/0226596 A1* | 10/2005 | Moriya et al. .................. | 386/48 |

FOREIGN PATENT DOCUMENTS

| | | |
|---|---|---|
| JP | 11145919 A | 5/1999 |
| JP | 2003517786 A | 5/2003 |
| JP | 2004320435 A | 11/2004 |
| JP | 2005318550 A | 11/2005 |
| JP | 2007518288 A | 7/2007 |
| WO | WO2004107228 | 12/2004 |
| WO | WO2005074255 | 8/2005 |

OTHER PUBLICATIONS

Broadcast Engineering: "New Thomson Ignite IQ Option Enhances Automation Capabilities," Thomson Grass Valley, Mar. 20, 2008.
International Preliminary Report on Patentability dated Oct. 12, 2010 and Written Opinion regarding PCT/US2008/013969.
PCT Publication No. WO2009/126129A1 dated Oct. 15, 2009 including International Search Report dated May 29, 2009 regarding PCT/US2008/013969.
Notification of Reasons for Refusal dated Mar. 12, 2013 regarding Japan Patent Application No. 2011-503952.
Final Rejection dated Mar. 25, 2014 regarding Japan Patent Application No. 2011-503952.
EP Communication dated Jun. 15, 2011 regarding EP Application No. EP08873829.9.
First Office Action dated Apr. 19, 2012 regarding China Patent Application No. 20088012895.1.
Japanese Office Action of Application No. 2011-503952, dated Jul. 31, 2013.
Pre-Appeal Report dated Oct. 15, 2014, regarding JPA 2011-503952.
"Ignite News Workflow Application Note," [online], Apr. 2007 [Jul, 31 H25 search], internet URL:http://www.grassvalley.com/docs/Application_Notes/newsprod/ignite/IPS-1038M.pdf.
Second Office Action dated Dec. 17, 2012, regarding China Application No. CN200880128595.1, and English translation.
EP Office Action dated Jul. 2, 2015, regarding EP Application No. EP08873829.9.
Canadian Office Action dated Mar. 11, 2016 from corresponding Application No. CA 2,720,256.

* cited by examiner

FIG. 7

Ignite IQ Rundown Markup

File ▷ Custom Selector ▷ Select Master ▷

Show: REAL WORLD SEM ▷ | Update | Update All |

| Pages | Story | Segment | Anchor | Clip | Tape | SS | TME | Update |
|---|---|---|---|---|---|---|---|---|
| | | | | | TYPE | | SHO LP | ☐ |
| A1 | SHOW OPEN | - | GARY GNU | | | | CAMM1CIP15CK4 LP | ☐ |
| A2 | HEADLINES | INTRO | GARY GNU, GARY | | | | SWRM: LP | ☐ |
| A3 | HEADLINES | VO | GARY | | HOVO | | CAMM1CIP15K4 LP | ☐ |
| A4 | DEER ATTACK | INTRO | GARY | | | | CAMC2M292 LP | ☐ |
| A5 | DEER ATTACK | LIVE-TAG | GARY | | | | BGX LP | ☐ |
| A6 | DEER ATTACK | LIVE | TRISHA, TRISHA | | | | CAMm1: LP | ☐ |
| A7 | HIGHWAY ACCIDENT | READER | GARY GNU, GARY | | | | CAM LP | ☐ |
| A8 | POLITICIAN SHOTS FIRED | INTRO | GARY GNU, GARY | | | | SOT LP | ☐ |
| A9 | POLITICIAN SHOTS FIRED | PACKAGE | JOHN | | | | CAMP3ECK4 LP | ☐ |
| A10 | POLITICIAN SHOTS FIRED | TAG | GARY | | | | REM LP | ☐ |
| A11 | BUS TRIP | LIVE | HEYWOOD | | | | CAMC2P2M2 LP | ☐ |
| A12 | BUS TRIP | INTRO | GARY GNU, GARY | | | | CAMC2P2M2 LP | ☐ |
| A13 | BUS TRIP | LIVE TAG | GARY GNU, GARY | | | | CAM | ☐ |
| A14 | FIRST LOOK WEATHER | WX WALL | ROSEVELTE E. ROSEVEL | | | | DBX LP | ☐ |
| A15 | FIRST LOOK WEATHER | DECK | ROSEVELTE, GARY ROSEV | | | | CAM LP | ☐ |
| A16 | TEASE | VO | GARY GNU, GARY | | | | SWRM: LP | ☐ |
| A17 | TEASE | W-VO | GARY | | | | | ☐ |
| B0 | BREAK 1 | - | - | | | | | ☐ |
| B1 | TOP STORIES | HEAD | GARY GNU, GARY | | | | | ☐ |
| B2 | TOP STORIES | WOMAN | GARY GNU, GARY | | | | | ☐ |

72

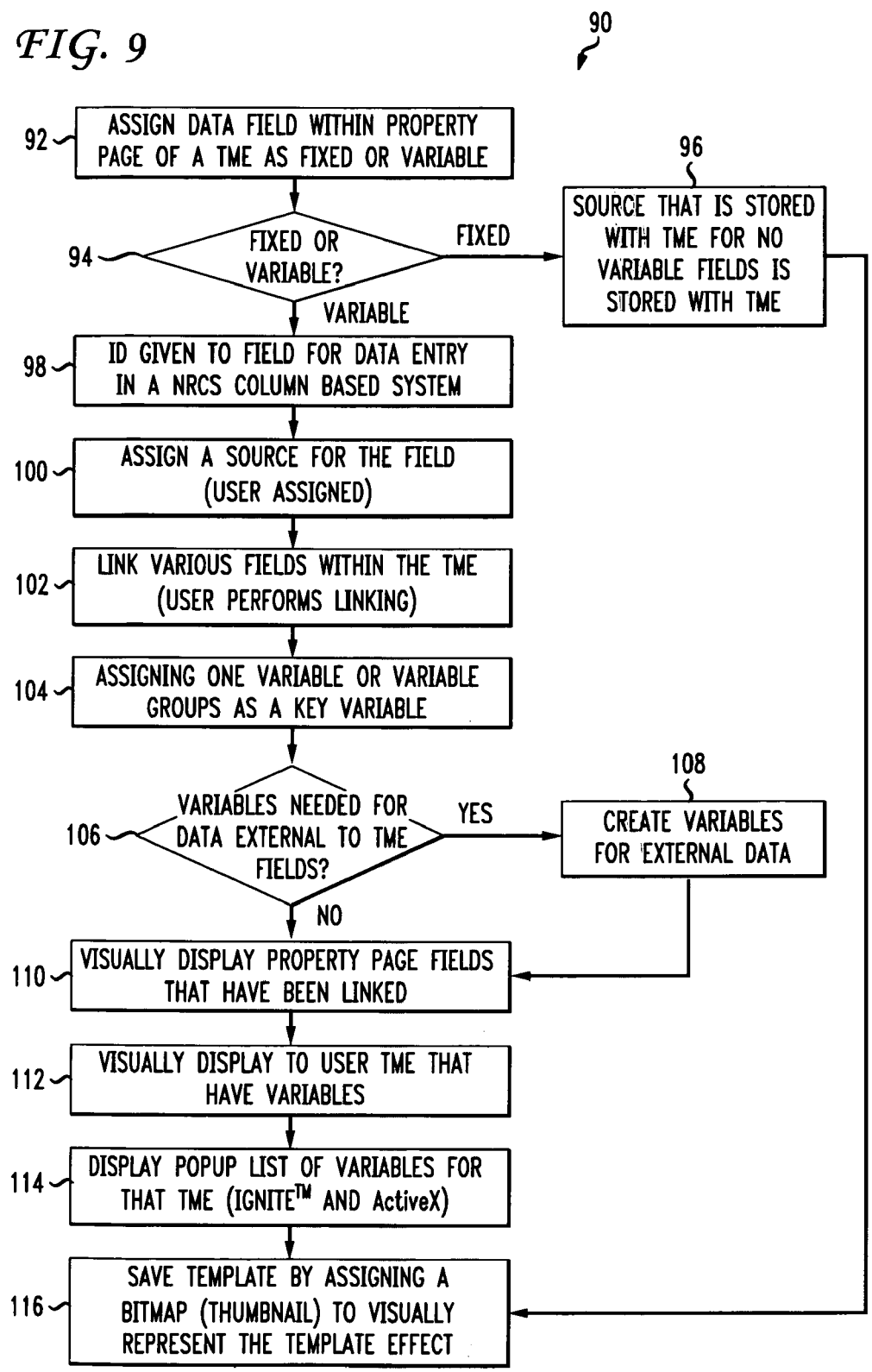

METHOD FOR AUTOMATED TELEVISION PRODUCTION

CROSS-REFERENCE TO RELATED APPLICATIONS

This application is a National Stage Application and claims the benefit, under 35 U.S.C. §365 of International Application PCT/US2008/013969 filed Dec. 22, 2008 which was published in accordance with PCT Article 21(2) on Oct. 15, 2009 in English, and which claims the benefit of U.S. Provisional Patent Application No. 61/123,914 filed on Apr. 11, 2008.

TECHNICAL FIELD

The present principles relates to television production. More particularly, it relates to automated television production, for example, news automation.

BACKGROUND ART

In television production, and more particularly news automation, the number of combinations of video, audio, digital video effects generators and other devices needed to create the unique events required to create a TV news program can easily number in the thousands. Managing the events created by the combination of devices can prove cumbersome and time consuming. Thus, an operator's decision to modify a particular event typically will require modification of all the individual variations of that event as well which could easily number in the hundreds. It is therefore apparent that many errors can occur in the hundreds of variations.

Some have attempted to solve this issue by breaking up the events into smaller discrete events that handle a single action, i.e. controlling audio fades, video switching, etc. The theory being that modifying one of these discrete events is easier than modifying a more complex event that consists of different actions. The drawback to this approach is that one must take these discrete events and put them together each time they need to be used. In other words, one would have to build each event every time they needed to use it. This significantly increases the time required to build a news program to the point where it cannot be considered a viable solution to the problem.

Other approaches proposed include the "Builder Utilities" that can, based on parameters, automatically generate all the combinations for that particular event. Using this approach will generate combinations that will never be used or do not make logical sense. This approach also requires that the user re-run this utility whenever a change occurs to a base event that served as the foundation for the various combinations arising from that event. Overall, this approach has proven cumbersome and wasteful.

BRIEF SUMMARY OF THE PRESENT PRINCIPLES

According to an implementation of the present principles, a method for updating a control event for controlling at least one device to produce audio visual content includes the steps of analyzing the control event to establish: (1) parameter(s) corresponding to the control event available for modification; and (2) parameter(s) of other control events influenced upon modification of at least one parameter corresponding to the control event, and modifying the parameter of the control event and other control events influenced thereby in response to user input changing at least one parameter of the control event available information.

The method can include the creation of a template to operate as one or more control events for the production. The creation of a template can include assigning a data field within a property page of the template as fixed or variable, storing source information for the data field with the template when the data field is fixed; and saving the template by assigning a bitmap to visually represent an effect of the template.

The creation of the template can include assigning a data field within a property page of the template as fixed or variable, providing identification (ID) for the data field for data entry into a production system, assigning a source for the data field, and linking one or more fields within the template. According to one implementation, multiple property assignments are grouped under a single variable entry. A key variable can be assigned to one variable or a variable group. A determination is then made as to whether variables are needed for data external to the template. Property page fields that have been linked and templates that have variables are displayed. A list of pop-up variables for that template undergoes display. The template is saved by assigning a bitmap to visually represent an effect of the template. The linking can include linking control room data (e.g., Newsroom Computer System (NRCS) data) and production system data with the template.

In accordance with another implementation, the linking further comprises automatically linking media ID and production event data (i.e., this data is separate data in the NRCS.

Other aspects and features of the present principles will become apparent from the following detailed description considered in conjunction with the accompanying drawings. It is to be understood, however, that the drawings are designed solely for purposes of illustration and not as a definition of the limits of the present principles, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numerals denote similar components throughout the views:

FIG. 7 depicts exemplary of a production system rundown markup interface according to an implementation of the present principles;

FIG. 9 depicts a flow chart illustrating the steps of a method for creating the transition m event template according to an implementation of the present principles.

DETAILED DESCRIPTION

As described in greater detail below, the present principles provides a technique for updating control events during automated television production, and thus has great value in connection with automated television production systems, especially those that make use of the Transition Macro Event (TME) concept used in the IGNITE® automated television production system manufactured by Thomson Grass Valley, Inc., Jacksonville, Fla. Those of skill in the art will recognize that the IGNITE® system is only one example of an automated television production system used in news automation environments, and that the principles of the present principles readily apply to other production systems without departing from the scope of this disclosure.

The present principles provides another layer (hereinafter referred to as the IQ layer) to production systems, such as, for example, the IGNITE® System, for enabling updating of parameters during automated television production such that modification of one parameter will automatically update other parameters linked to the modified parameters. The term "IQ" serves to differentiate a standard TME with fixed data from a Production Event (IQT) that has expanded variable data that manually or automatically changed during use. This IQ layer allows the creation of a new type of TME (referred to herein as the "IQ Template") which provides flexibility to adapt future changes in production system (e.g., newsroom) equipment and talent.

A Transition Macro Event (TME) constitutes logical grouping of device events that are arranged on a timeline that, such that upon execution of the event, commands get sent by the automated production system to various devices to produce the desired television production event. Each device event has properties that determine the behavior of the equipment performing one or more processes associated with the desired event. For a more detailed explanation of an automated production system, and the manner in which a TME controls various devices, refer to U.S. Pat. No. 7,302,644 incorporated by reference herein.

Figure 1:
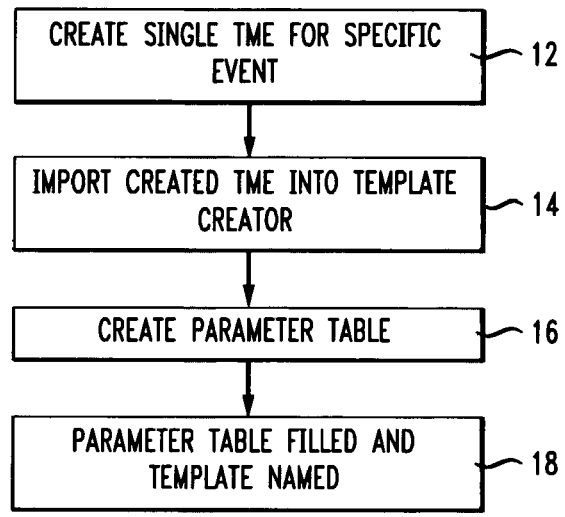
FIG. 1 depicts a flow diagram illustrating the steps of a method in accordance with a for updating a control event by creating a transition macro event (TME) template according to an implementation of the present principles.

FIG. 1 depicts a process 10 for creating a template according to an implementation of the present principles. The IQ template referred to herein can be considered to be one or more control events that are used during the production. Generally speaking, to create a template, the user creates a Single TME for a specific event (12). The user imports (14) that TME into the Template Creator application of the respective production system, which analyzes the original TME and makes all the variables available for insertion into a parameter table. The user then creates (16) the parameter table by creating a user variable and selecting the parameters controlled by that variable. The user then fills (18) the parameter table and names the template. During the fill stage (18), the user can also create additional tables.

Figure 2:
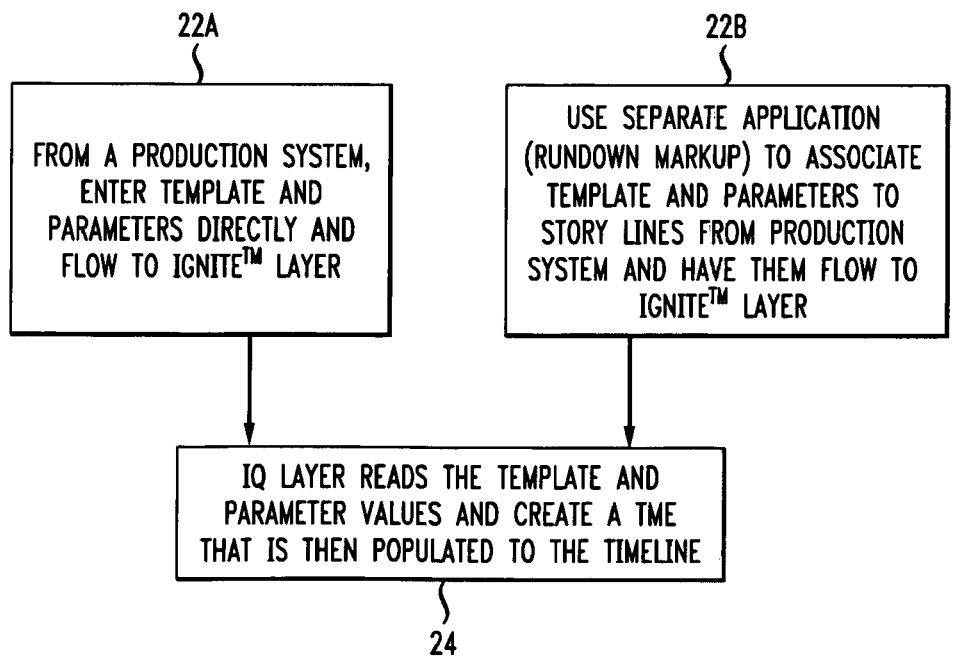
FIG. 2 depicts a flow chart diagram illustrating the steps of a process of using the template of FIG. 1 according to an implementation of the present principles.

FIG. 2 describes a process 20 for the template created in FIG. From the television production System (e.g., News Room Computer System), the producer or director can enter (22a) the template and parameters directly and have them flow to the IQ Layer of the present principles. Alternatively, the director can use a separate application (22b) called the "Rundown markup" to associate templates and parameters to story lines from the production system and have them flow to the IQ Layer of the present principles. Once sent, the IQ Layer reads (24) the template and parameter values and then creates a TME later then populated to the timeline.

Figure 3:
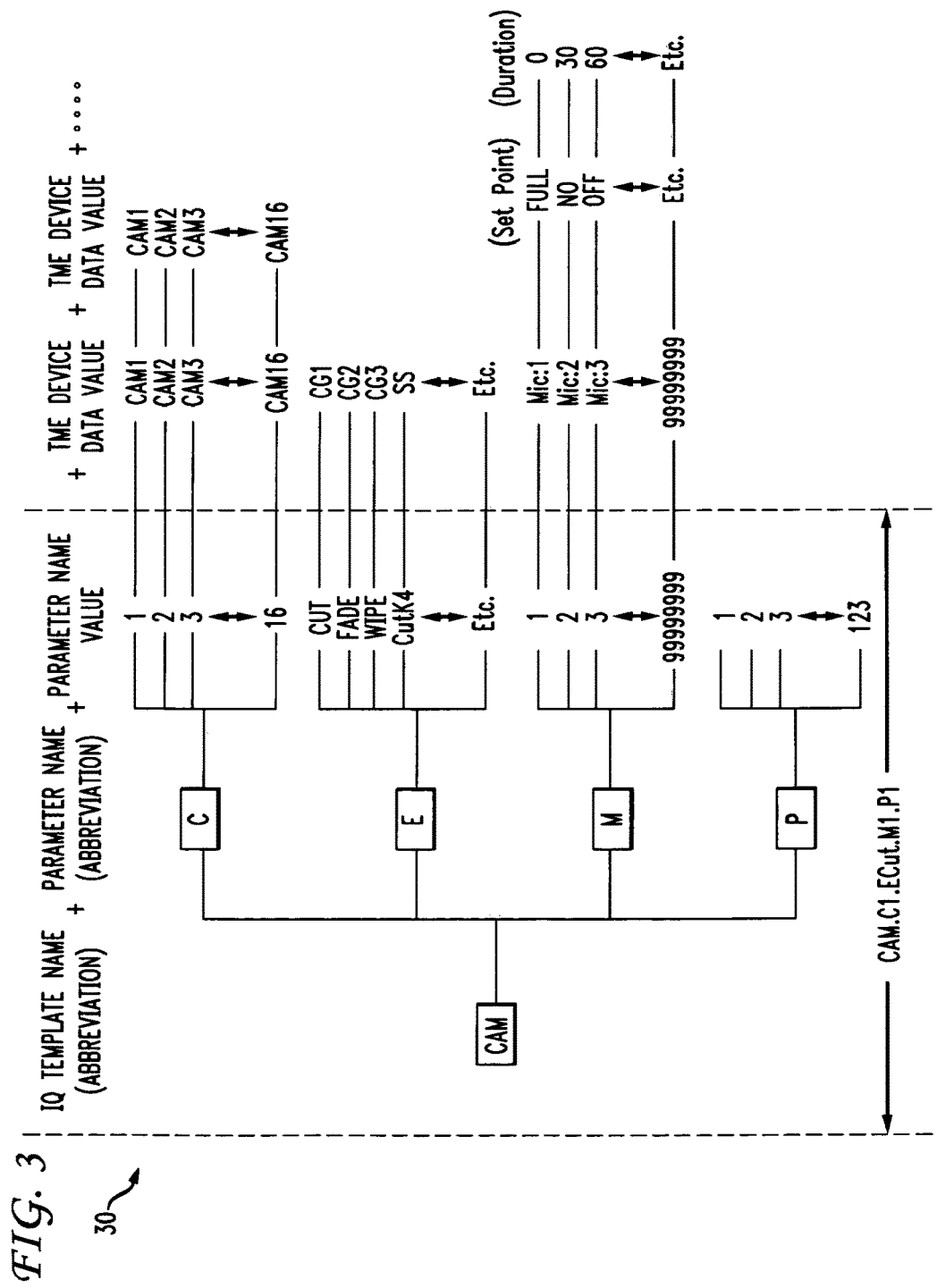
FIG. 3 illustrates an exemplary camera template according to an implementation of the present principles.

FIG. 3 depicts an example of a Camera Template 30 showing the association between the IQ template name, "CAM", and all components that comprise this template, according to an implementation of the present principles. By way of example, the sequence of components to enter for a TME in either a Newsroom Computer System or the Rundown Markup dialog box is:

IQ Template Name.ParameterNameParameterNameValue. ParameterNameParameterNameValue.ParameterNameParameterNameValue . . . .

where a period separates the IQ Template name from each parameter name and parameter value group.

Each TME can have multiple parameter names and parameter name value groups, and each group can be entered in any order. At the bottom of the exemplary TME shown in FIG. 3 "CAM.C1.ECut.M1.P1", means that the CAM template contains this specific TME which, when imported into the rundown, performs the following tasks:

Uses Camera 1 or C1 (C1); contains an Effect that is a Cut (Cut);

Uses Microphone 1 (M1); and

Uses Preset 1 (P1).

Figure 4:
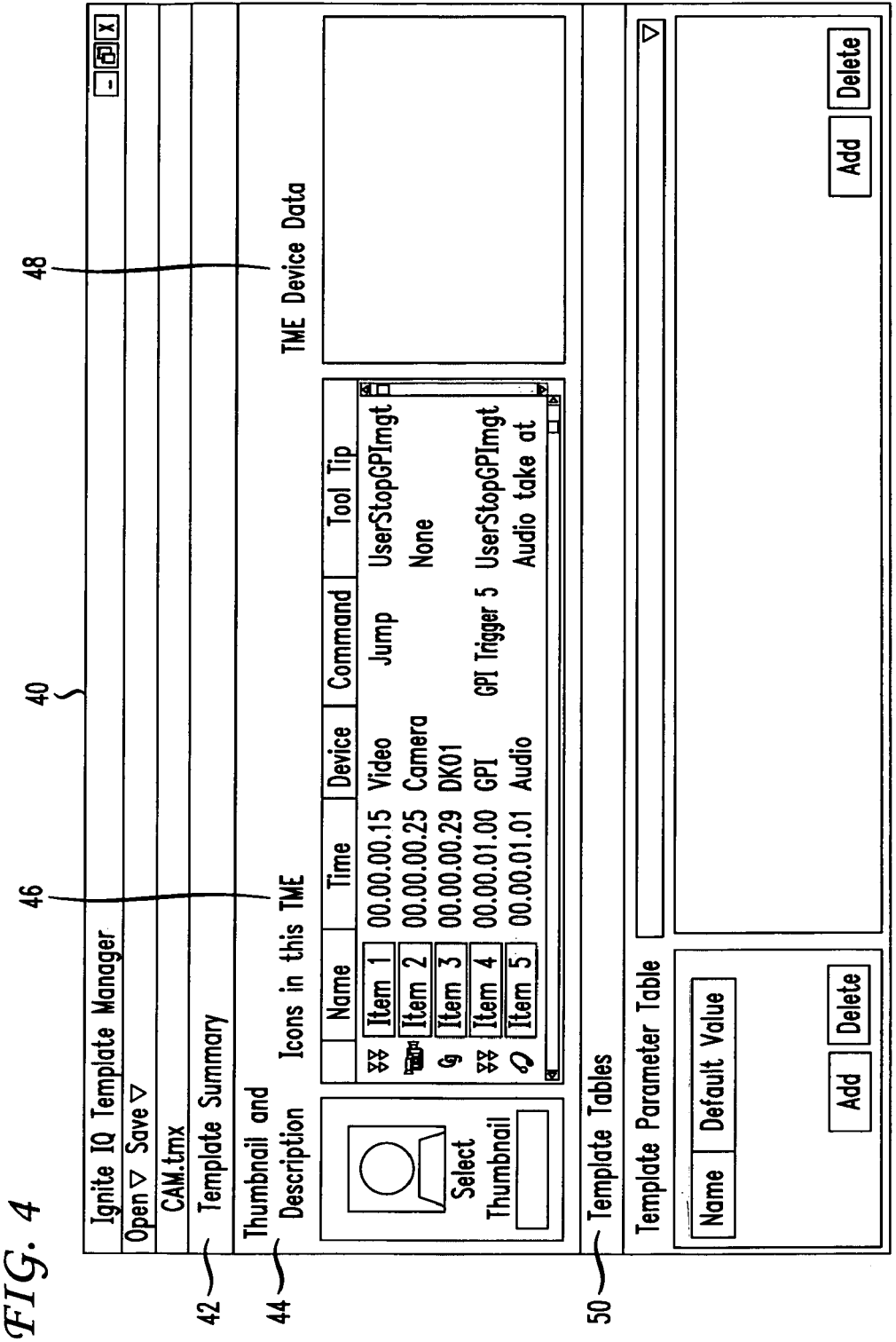
FIG. 4 depicts is an exemplary graphical user interface for a template manager according to an implementation of the present principles.

FIG. 4 shows an example of the Template Manager 40 according to an implementation of the present principles. The Template Manager 40 constitutes the interface used to manage TME and IQ Template information according to the present principles. From top to bottom, the template manager 40 includes a Template Summary area 42 which contains descriptive information about the template, a list of the devices used in the TME, and a list of the device data associated with each device in the TME. Within the Template Summary area 42, there resides a thumbnail and description field 44 which is an area that allows a user to assign a thumbnail graphic and description to a template. The Icons within this TME area 46 contain information displayed about each device item in the TME (e.g., parameters). The TME Device Data area 48 provides information relating to selections made in the Icons in this TME area 46. Thus, when a TME element is selected under the Icons for this TME (46), then the corresponding data device data for that TME appears under the TME Device Data area 48. The bottom part of the template 40 comprises the Template Table area 50.

Figure 5:
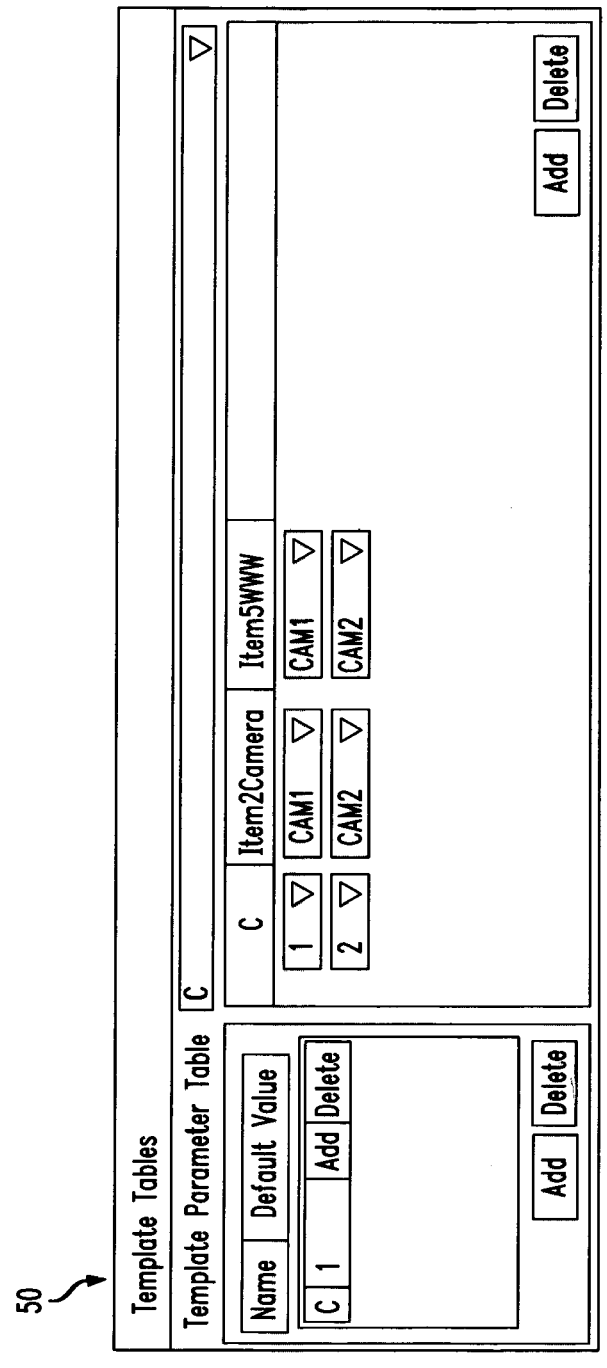
FIG. 5 depicts an enlarged view of a portion of a template table area of template manager shown in FIG. 4, according to an implementation of the present principles.

FIG. 5 shows a closer view of the Template Table area 50 according to an exemplary implementation of the present principles. The Template Table area 50 allows a user to create, edit and maintain parameter tables. As shown, the Template Table area 50 includes "parameter" related fields, such as, for example, Parameter Names, Parameter Name Values, TME Device Data Items, TME Device Data Values, Parameter Name List, Add/Delete Parameter Names, Add/Delete Parameter Name Values.

Figure 6:
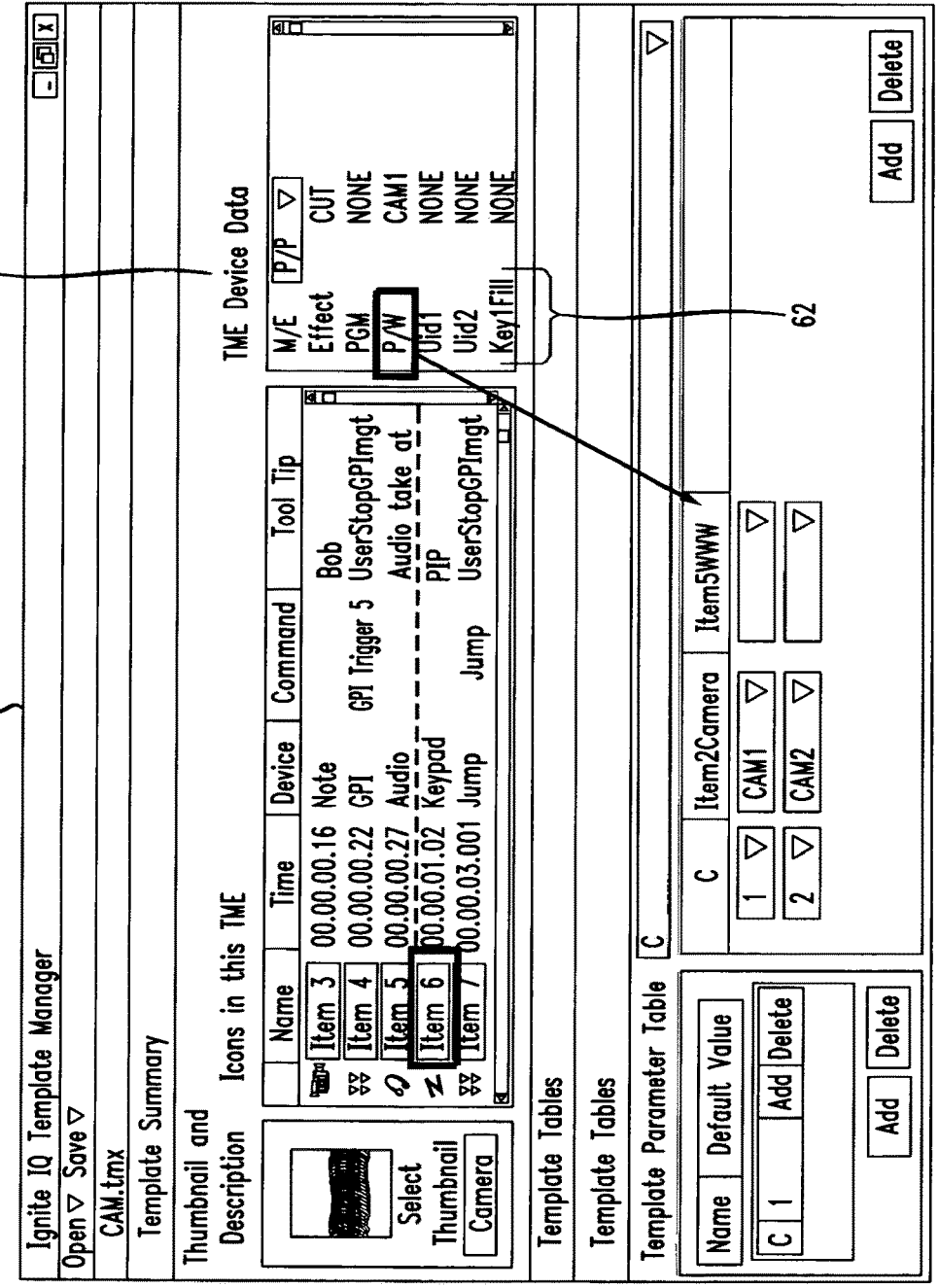
FIG. 6 depicts an alternative exemplary view of the graphical user interface for the template manager, according to an implementation of the present principles.

FIG. 6 depicts another example of the Template Manager 40 showing how the Preview Source value for the a video switcher, such as the Kayak® Video Switcher, from Thomson Grass Valley, has been added as a column 62 to the TME Device Data area 48. Now the user can change the video source based on parameters passed into the template. The video switcher properties refer to the list of properties that can be changed in the "IQT Template Manager/TME Device Data" for a switcher Control Object in a TME for control of the Video Switcher. The following comprises an exemplary list of properties the can be changed:

1. M/E (Assigns which Mix Effect Bank is controlling on the video Switcher);
2. Effect (Assigns the Ignite Effect, which determines the effect data sent to the video switcher);
3. PGM (Assigns the video source for the Program Bus of the Video Switcher);
4. PVW (Assigns the video source for the Preview Bus of the Video Switcher);
5. Util1 (Assigns the video source for the Utility 1 Bus of the Video Switcher);
6. Util2 (Assigns the video source for the Utility 2 Bus of the Video Switcher);
7. Key1Fill (Assigns the video source for the Key1 Fill Bus of the Video Switcher);
8. Key2Fill (Assigns the video source for the Key2 Fill Bus of the Video Switcher);
9. Key3Fill (Assigns the video source for the Key3 Fill Bus of the Video Switcher);
10. Key4Fill (Assigns the video source for the Key4 Fill Bus of the Video Switcher);
11. Key1Key (Assigns the video source for the Key1 Key Bus of the Video Switcher);
12. Key2Key (Assigns the video source for the Key2 Key Bus of the Video Switcher);
13. Key3Key (Assigns the video source for the Key3 Key Bus of the Video Switcher); and
14. Key4Key (Assigns the video source for the Key4 Key Bus of the Video Switcher).

The top center window shows "Icons in this TME" 46, which shows the device type included in the TME/IQT. When a user selects one of the "Icons" or device in the list (e.g., by left mouse click), the "TME Device Data" window is populate with editable properties for the selected device. The user can drag & drop any of the properties of the selected device into the "Template Parameterized Table" 52 to be associated with the selected variable. The arrow show the PVW (i.e., preview) Bus property of the Video Switcher has been added to Variable "C" of the Template table, by dragging the property into the Template table.

FIG. 7 shows an example of the IQ Rundown Markup 70 interface according to an implementation of the present principles. The IQ Rundown Markup interface provides an improved method of marking up rundown information in a show. The IQ Rundown Markup application improves the way TME/IQT data is entered into the automated television production system to populate the Event Timeline with production commands from the NRCS because it is linked to both the NRCS data and IQ data. Without IQ Rundown Markup, users enter text data for the TME/IQT name in a designated TME column within the NRCS but they must rely on memory for the correct name and configurable parameters for the IQT. The IQ Rundown Markup can be configured to displays any column data from the NRCS (For example Story running order, Page Number, Page Slug, Segment, Anchor, Clip, Tape, SS). It automatically updates for changes made in the NRCS, and displays which Story/Page has changed. The user has access to drop down list to change the values of Template Parameters and does not have to rely on memory.

The IQ Rundown Markup dialog box is an interface that obtains the rundown information directly from the NRCS and displays this information in the dialog box. When this application is used, as opposed to entering data directly through the NRCS, the user can access the TME Details screen 72 which allows the user to search through the templates and see the parameters and values.

Figure 8:
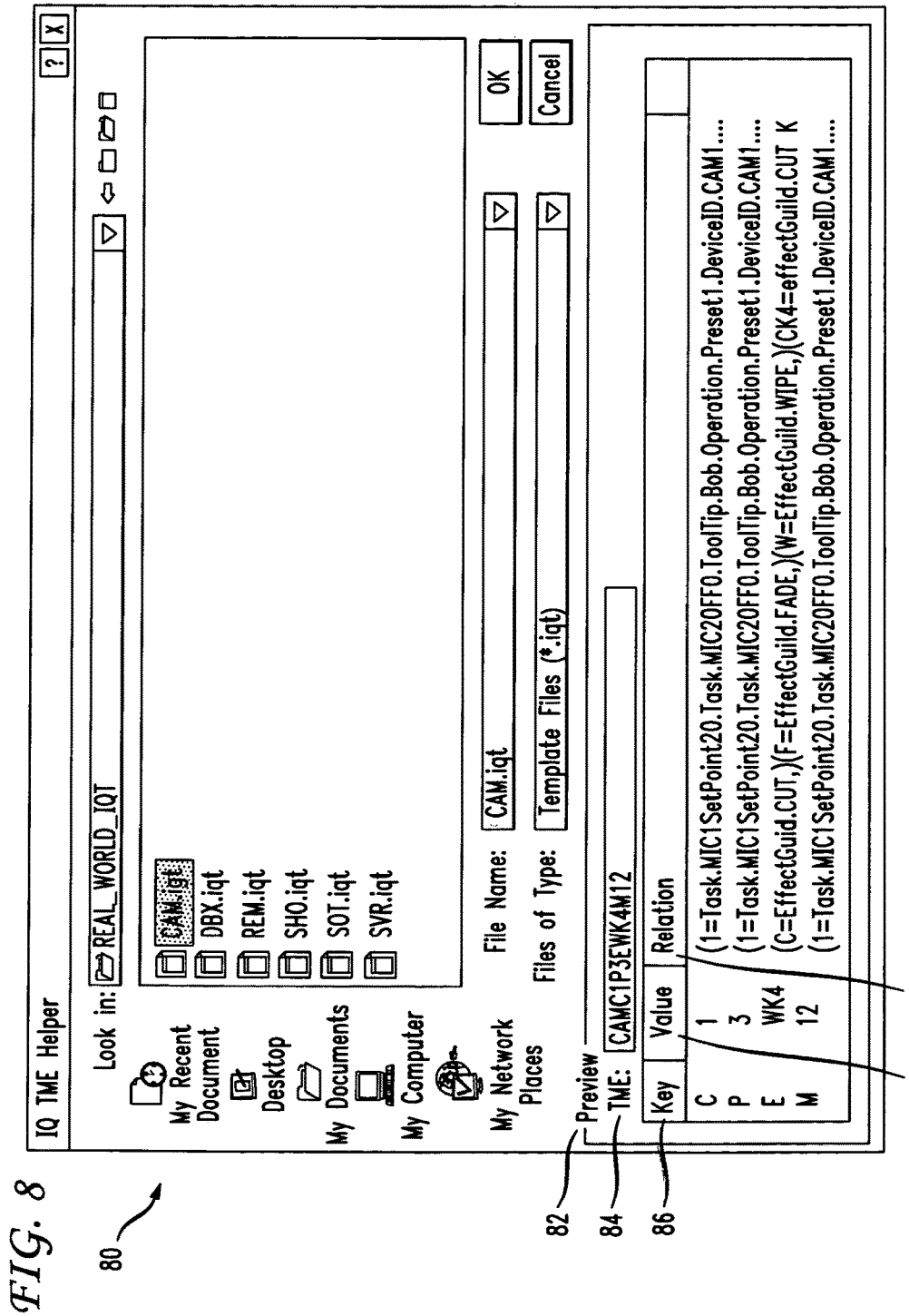
FIG. 8 depicts an example of a TME Helper interface, according to an implementation of the present principles.

FIG. 8 shows an example of the IQ TME Helper 80 according to an exemplary implementation. The IQ TME Helper 80 is used to find and select a TME/IQT to assign to a line of the IQ Markup Application. The upper portion of the IQ TME Helper is a standard Microsoft WINDOWS EXPLORER window consisting of:

Look In (selects the directory to look in);
File List (list of TME/IQT files);
File Name (Name of the selected file);
Files of type: (filters the File List for TME/IQT files); and
OK (Assigns the TME/IQT to the IQ Markup Application).

The lower portion of the IQ TME Helper consists of: a Preview area 82; a TME area 84 that shows the base name of the TME, plus the parameters and default values for each parameter. Within the preview area 82, other displayed fields include a Key field 86 where a list of the parameter names or key is provided, a Value field 87 which provides a list of the value of each parameter (note, upon clicking the value of a parameter via computer mouse or the like, a drop down list is opened with a list of values for the selected parameter), and a Relation field 88 that shows the fields and the values that are associated with the selected value.

FIG. 9 shows a flow chart of an exemplary implementation of a he method 90 for creating a new type of TME (i.e., the IQ Template of the present principles) which, as explained above, provides flexibility to adapt future changes in production system (e.g., newsroom) equipment and talent. Initially, each data field within a property page of a TME is assigned (92) as fixed or variable. By default, if a field within a property page is not assigned as variable (94), then it is fixed within the TME. Those of skill in the art will appreciate that "fixed" does not mean the TME cannot be edited, but that the source that is stored with the TME, for no variable fields, is stored with the TME.

When a field is assigned as variable, the field is given an identification (ID) for data entry in an NRCS column-based system (98). Here, the user would enter the TME base ID, and the Field ID with the Field value. For example if the user has created a VO TME (that has no field linking) and has four variable fields (e.g., "VP"—video preview bus & "Full"—audio preset event & "Under"—audio preset event & "MC"—machine control), the user would enter into the NRCS TME column "VO-VPVR2-FullMic1-UnderVR2-MCVR2" at this step 98.

A "VO" TME is a TME that is designed to roll a clip, transition the video to air, and bring an audio source on (usually an anchor microphone) so that the anchor can read over the video. Those of skill in the art will recognize that "VO" is an acronym for Voice Over—meaning a live source will read over the video clip, and "NAT" stands for Natural Sound—meaning that a live source will read over a clip that has natural sound under.

Within the same TME, some fields will be fixed (with assigned sources or not), and some fields get assigned as being variable, thus requiring a default source. When a field gets assigned as being variable, the user must also assign a source (100) for the field. That way, if a TME is created with variable fields, the TME can be recalled as the base without any field data being added. For example if the user created the above VO TME and, as required, assigned sources for the four variable fields (e.g., "VP"—VR1 & "Full"—Mic1 & "Under"—VR1 & "MC"—VR1), then when the TME is recalled it will have the default sources for each variable.

In addition to the above, when the data field is assigned as being variable, the present principles provide the user with a means to link various fields within the TME (102). For example, in the above VO TME scenario, there are three different property pages that have fields that need to be linked. The Video property page (Preview Bus-Field) is linked to the Audio property page (e.g., VR (virtual recorder) "Full" audio preset event), the VR Machine Control (Load), and the VR Machine Control (Play). The user could assign the Video (Preview Bus-Field) as the variable and link the audio event, Machine Control fields. In the NRCS TME column, the user would enter "VO-VPVR2". When the TME is imported by the automated television production system, the linked fields would be updated to correspond with the VR2 selection.

Once linked (102), one variable or a group of variables ("Variable Groups") must be assigned as the key variable (104). By assigning a key variable, other variables linked to this field will change based on source mapping assignments, when the key variable source is changed. Variable fields can be linked within the same property page and/or to other property page fields. Variable fields can be grouped together and the group linked to other property page fields. For example for a camera TME, the Camera field would be "Grouped" with the Preset field. The grouped fields would be linked to the video preview bus field and the audio event, for example, a "Full-MIC" has the capability to create audio actions that can be recalled from a TME/IQT. The naming of these actions is user defined, so the name can be anything. In this case the name "Full MIC" describes the action of taking a microphone source to the full position. "Full-MIC" is just an example of what a user might call this audio action. The combination of selections of the Camera & Preset would call out independent source mapping.

A TME can contain one or more variables that are linked to other fields and the field's linkage should be unique to each variable. For example a Video (Preview Bus-field) variable that is linked to an audio "Full" preset event for one audio source, a second Video (Key1 Fill Bus-field) can be linked to an audio "Full" preset event, but not to the same audio event as the first linked variable. Sometimes variables can need to be created for data that are external to TME fields. This is determined at step (106). For example, one might want to extract data from the rundown (Shot-Type, Anchor) and link this data to TME field data. The shot type, and anchor assignment can be mapped to a camera, preset, video input, or audio event. Both during and after the linking and assigning of key variables, the Property page fields that have been linked are visually displayed (110). As will be appreciated by those of ordinary skill in the art, the sources must be assigned to other linked sources. For example video source VR1 must be linked to audio source VR1, and to machine control device VR1. If a variable is linked to other fields, then only sources that are applicable for that field and have been mapped to sources for the corresponding linked fields will be selectable. If a variable is linked to other fields, but no source mapping has been assigned, then sources that are applicable for the variable field will be displayed, but not selectable. The item needs to visually indicate missing data.

Within the same TME one might have a variable that is linked to other fields and a variable that is independent. For example if the user created the above VO TME, the Video property page (Preview Bus-Field) is linked to the Audio property page (VR) (virtual recorder) "Full" audio preset event), the VR Machine Control (Load), and the VR Machine Control (Play). A second variable is created for the audio "Full" event. The user would enter into NRCS TME column VO-VPVR2-FullMic2. At this stage, the TMEs that have variables are visually displayed (112). For both the Timeline & Rundown List and ActiveX found in the IGNITE® automated television production system, a pop-up list of variables for that TME is also displayed (114). Once completed, the template is saved (116). When saved, the template is assigned a bitmap (thumbnail) to visually represent the Template effect.

It is to be understood that the present principles can be implemented in various forms of hardware, software, firmware, special purpose processors, or a combination thereof. Preferably, the present principles can be implemented as a combination of hardware and software. Moreover, the software is preferably implemented as an application program tangibly embodied on a program storage device. The application program can be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein can either be part of the microinstruction code or part of the application program (or a combination thereof) that is executed via the operating system. In addition, various other peripheral devices can be connected to the computer platform such as an additional data storage device and a printing device.

It is to be further understood that, because some of the constituent system components and method steps depicted in the accompanying Figures are preferably implemented in software, the actual connections between the system components (or the process steps) can differ depending upon the manner in which the present principles is programmed. Given the teachings herein, one of ordinary skill in the related art will be able to contemplate these and similar implementations or configurations of the present principles. While there have been shown, described and pointed out fundamental novel features of the present principles, it will be understood that various omissions, substitutions and changes in the form and details of the methods described and devices illustrated, and in their operation, can be made by those skilled in the art without departing from the scope of the same. For example, it is expressly intended that all combinations of those elements and/or method steps which perform substantially the same function in substantially the same way to achieve the same results are within the scope of the present principles. Moreover, it should be recognized that structures and/or elements and/or method steps shown and/or described in connection with any disclosed form or implementation of the present principles can be incorporated in any other disclosed, described or suggested form or implementation as a general matter of design choice. It is the intention, therefore, to be limited only as indicated by the scope of the claims appended hereto.

The invention claimed is:

1. A method for updating a first control event for controlling at least one device in automated television production system, comprising:
    analyzing, via a processor, the first control event comprised in a macro event used for controlling the at least one device in automated television production to create a template for the macro event that includes: (1) a first set of parameters associated with the first control event available for modification; and (2) a second set of parameters associated with a second control event comprised in the macro event;

receiving a link between a variable parameter of the first set of parameters associated with the first control event and a variable parameter of the second set of parameters associated with the second control event to prevent conflicts between the respective variable parameters of the first and second parameters for controlling the at least one device during the automated television production;

creating a rundown markup interface by populating an event timeline with newsroom computer system (NRCS) data for the automated television production and with a plurality of production commands including at least one production command linked to the macro event for controlling the at least one device during the automated television production;

presenting, on the rundown markup interface, a drop down list of a range of parameters for the variable parameter of the first set of parameters associated with the first control event;

receiving, from a user during the automated television production, a selection of the drop down list to modify the variable parameter populated in the event timeline of the rundown markup interface from the first set of parameters associated with the first control event; and automatically modifying during the automated television production the linked variable parameter from the second set of parameters associated with the second control event populated in the event timeline of the rundown markup interface in response to the selection by the user of the variable parameter associated with the first control event.

2. The method according to claim 1, wherein said template is created by:
assigning a data field within a property page of the template as fixed or variable;
storing source information for the data field with the template when the data field is fixed; and
saving the template by assigning an image to visually represent an effect of the template.

3. The method according to claim 1, wherein said template is created by:
assigning a data field within a property page of the template as fixed or variable;
providing an identification for the data field for data entry into a production system;
assigning a source for the data field;
linking one or more data fields within the template;
assigning a key variable to one variable or a variable group; and
determining whether variables are needed for data external to the template.

4. The method according to claim 3, further comprising:
displaying property page fields that have been linked and templates that have variables;
displaying a pop-up list of variables for that template; and
saving the template by assigning an image to visually represent an effect of the template.

5. The method according to claim 4, wherein said linking comprises linking control room data and production system data with the template.

6. The method according to claim 4, further comprising grouping multiple property assignments under a single variable entry.

7. The method according to claim 5, wherein said linking further comprises automatically linking media identification data and production event data.

8. The method of claim 1, further comprising receiving user input to modify the parameter corresponding to the first control event, wherein the parameters of first and second control events are modified in response to the user input.

9. The method of claim 1, further comprising designating a third control event as fixed to a source, wherein the third control event is unmodified in response to the modification of the parameter of the first control event.

10. The method of claim 1, further comprising modifying parameters of a plurality of control events in response to the modification of the variable parameter of the first control event.

11. The method of claim 1, further comprising modifying a parameter of a third control event, wherein a parameter of the second control event is modified in response to the modification of the third control event.

12. An automated television production apparatus for controlling at least one device in automated television production system, comprising:
at least one processor executing instructions stored in memory, the processor configured to:
analyze a first control event comprised in a macro event used for controlling the at least one device in automated television production to create a template for the macro event that includes: (1) a first set of parameters associated with the first control event available for modification; and (2) a second set of parameters associated with a second control event comprised in the macro event;
receive a link between a variable parameter of the first set of parameters associated with the first control event and a variable parameter of the second set of parameters associated with the second control event to prevent conflicts between the respective variable parameters of the first and second parameters for controlling the at least one device during the automated television production;
create a rundown markup interface by populating an event timeline with newsroom computer system (NRCS) data for the automated television production and with a plurality of production commands including at least one production command linked to the macro event for controlling the at least one device during the automated television production;
present, on the rundown markup interface, a drop down list of a range of parameters for the variable parameter of the first set of parameters associated with the first control event;
receive, from a user during the automated television production, a selection of the drop down list to modify the variable parameter populated in the event timeline of the rundown markup interface from the first set of parameters associated with the first control event; and
automatically modify during the automated television production the linked variable parameter from the second set of parameters associated with the second control event populated in the event timeline of the rundown markup interface in response to the selection by the user of the variable parameter associated with the first control event.

13. The apparatus according to claim 12, wherein the at least one processor is further configured to create the template by:
assigning a data field within a property page of the template as fixed or variable;

storing source information for the data field with the template when the data field is fixed; and saving the template by assigning an image to visually represent an effect of the template.

14. The apparatus according to claim 12, wherein the at least one processor is further configured to create the template by:
   assigning a data field within a property page of the template as fixed or variable;
   providing an identification for the data field for data entry into a production system;
   assigning a source for the data field;
   linking one or more data fields within the template;
   assigning a key variable to one variable or a variable group; and
   determining whether variables are needed for data external to the template.

15. The apparatus according to claim 14, wherein the at least one processor is further configured to:
   display property page fields that have been linked and templates that have variables;
   display a pop-up list of variables for that template; and
   save the template by assigning an image to visually represent an effect of the template.

16. The apparatus according to claim 15, wherein said linking comprises linking control room data and production system data with the template.

17. The apparatus according to claim 15, wherein the at least one processor is further configured to:
   group multiple property assignments under a single variable entry.

18. The apparatus according to claim 17, wherein said linking further comprises automatically linking media identification data and production event data.

19. The apparatus of claim 12, wherein the at least one processor is further configured to:
   designate a third control event as fixed to a source, wherein the third control event is unmodified in response to the modification of the parameter of the first control event.

20. The method of claim 1, wherein the first and second control events comprise fields that are fixed and fields that are variable, fixed fields having fixed assigned source and variables having a default assigned source and being capable of having a source mapping changed, the method further comprising:
   modifying the variable parameter from the set of parameters corresponding to the first control event by changing the source mapping of a variable field.

21. The method of claim 1, further comprising:
   receiving an assignment of the variable parameter corresponding to the first control event as a key variable parameter.

22. The apparatus of claim 12, wherein the first and second control events comprise fields that are fixed and fields that are variable, fixed fields having fixed assigned source and variables having a default assigned source and being capable of having a source mapping changed, the at least one processor being further configured to:
   modify the variable parameter from the set of parameters corresponding to the first control event by changing the source mapping of a variable field.

23. The apparatus of claim 12, wherein the at least one processor is further configured to:
   receive an assignment of the variable parameter corresponding to the first control event as a key variable parameter.

24. An automated television production apparatus for controlling a plurality of devices in an automated television production system, the apparatus comprising one or more processors in communication with one or more memories storing instructions that when executed provide:
   a template manager configured to:
      create a template for a macro event that includes a first set of parameters for controlling at least one of the plurality of devices during television production,
      assign at least a first portion of the plurality of the first set of parameters as variable parameters with each variable parameter having a respective variable field, with each variable field being assigned a default source,
      assign at least a second portion of the plurality of the first set of parameters as fixed parameters,
      link at least one variable field of a first variable parameter of the variable parameters with another at least one variable field of a second variable parameter of the variable parameters,
      assign one of the first variable parameter or the second variable parameter as a key variable that is linked to the other of the first and second variable parameter and also linked to at least one variable parameter associated with an additional macro event;
   a rundown markup interface generator configured to:
      receive newsroom computer system (NRCS) data,
      generate a rundown markup interface by populating, using the NRCS data, an event timeline with a plurality of production commands that includes a plurality of macro events including the macro event that includes the first set of parameters having the variable parameters that are not static and configured to be modified during the television production and the additional macro event;
   a display configured to display during television production the rundown markup interface that includes the event timeline with the plurality of production commands; and
   an automated television production system configured to prevent source conflicts of the plurality of devices used for the television production by:
      dynamically changing a source value of the key variable on the fly during the television production, and
      in response to the change in the source value of the key variable, automatically modifying on the fly during the television production, the at least one of the linked variable fields of the first set of parameters and a variable field of at least one variable parameter associated with the additional macro event that are both linked to the key variable.

25. The automated television production apparatus of claim 24,
   wherein the rundown markup interface displays each variable field of each variable parameter as a pull-down list of a plurality of sources, and
   wherein the automated television production system dynamically changes one of the plurality of sources for each variable field on the fly during television production in response to a user selecting a source value of one of the variable fields using the pull-down list, respectively.

26. The automated television production apparatus of claim 24, wherein the template manager is further configured to save the template for the macro event by assigning an image to visually represent an effect of the template; and wherein the rundown markup interface displays the image visually representing the effect of the template.

27. The automated television production apparatus of claim 24, wherein the rundown markup interface includes the NRCS data having a story running order with a plurality of stories, and visually associates one or more macro events of the plurality of macro events with respective stories of the plurality of stories.

28. The automated television production apparatus of claim 24, wherein the rundown markup interface is automatically updated during the television production to reflect on the fly changes to the NRCS data.

29. The automated television production apparatus of claim 24, wherein the automated television production system accesses at least one of the plurality of macro events during the television production, and changes a source value of at least one variable field of a corresponding variable parameter on the fly during the television production to dynamically change a source for the at least one device associated with the accessed macro event.

30. The automated television production apparatus of claim 24,
wherein the rundown markup interface receives an instruction input from a user of the rundown markup interface to change the source value of the key variable; and
wherein, in response to the instruction input from the user, the automated television production system automatically modifies the at least one of the linked variable field of the corresponding variable parameter that is linked to the key variable to change on the fly during the television production the respective parameters for controlling the at least one device for the television production associated with the macro event including the automatically modified variable parameter.

31. The automated television production apparatus of claim 24, wherein the automated television production system is further configured to dynamically change the source value of the key variable in real-time during the television production.

32. A system for automating television production that dynamically adjusts device control parameters to prevent conflicts between production devices during television production, the system comprising one or more processors in communication with one or more memories storing instructions that when executed provide:
a template generator configured to create a macro event template that includes a video property field and an audio property field for controlling device operation parameters of at least one production device during the television production, wherein the video property field designates a video source and the audio property field designates an audio source for the at least one production device;
a variable parameter assignment module configured to assign the video property field of the macro event template as non-static, variable parameter that is configured to be modified during the television production to dynamically switch the video source for the at least one production device to capture video data for the television production;
a parameter linking module configured to link the assigned non-static, variable parameter of the macro event template with the audio property field to prevent conflicts between the video source and the audio source when capturing the video and audio data by the at least one production device during the television production;
a video production generator configured to generate a rundown markup interface by populating an event timeline with newsroom computer system (NRCS) data for the television production and including the macro event template with the video and audio property fields for controlling the device operation parameters of the at least one production device during the television production; and
an automated television production system that automates the television production by dynamically changing the non-static, variable parameter of the video property field during the television production to switch and set the video source for the at least one production device to capture the video data, and automatically modifying the linked audio property field to set on the fly the audio source for the at least one production device to capture audio data during the television production to prevent conflicts when capturing the audio and video data during the automated television production.

33. The system for automating television production according to claim 32,
wherein the template generator is further configured to create a plurality of macro event templates that each includes the video and audio property fields controlling the device operation parameters of the at least one production device during the television production, and
wherein the parameter linking module is configured to link the assigned non-static, variable parameter of the macro event template with the audio property field of each of the plurality of macro events to prevent conflicts between the video source and the audio source of the at least one production device during the television production.

34. The system for automating television production according to claim 33, wherein the automated television production system automatically and on the fly modifies the linked audio property field of each of the plurality of macro event templates during the television production to set the audio source for the at least one production device to capture the audio data to prevent conflicts between the video source and the audio source when capturing the video and audio data during the automated television production.

35. The system for automating television production according to claim 32, wherein the instructions when executed further provide a fixed parameter assignment module configured to assign an additional property field of the macro event template as static, fixed operational parameter for the at least one production device that cannot be modified during the automated television production.

36. The system for automating television production according to claim 33, further comprising a display configured to display during the automated television production the rundown markup interface that includes the event timeline with the plurality of the macro event templates and a user interface for receiving a user selection of the non-static, variable parameter of the video property field to switch and set the video source for the at least one production device during the automated television production.

37. The system for automating television production according to claim 33, wherein the user interface of the rundown markup interface displays the video property field as a pull-down list of a plurality of video sources, and wherein the automated television production system dynamically changes and sets the video source for the video property field on the fly during the automated television production in response to the user selecting a source value of the video property field using the pull-down list to designate a different video source of the plurality of video sources for the at least one production device.

38. The system for automating television production according to claim 32, wherein the template generator is further configured to save the created macro event template by assigning an image to visually represent an effect of the created macro event template, and wherein the rundown markup interface displays the image visually representing the effect of the created macro event template.

39. The system for automating television production according to claim 32, wherein the rundown markup interface includes the NRCS data having a story running order with a plurality of stories and visually associates the macro event template with a respective story of the plurality of stories.

40. An automated television production system that adjusts device control parameters to prevent conflicts of production devices during television production, the system comprising one or more processors in communication with one or more memories storing instructions that when executed provide:
   a template generator configured to generate a template for a macro event that includes at least first and second device operation property fields for controlling respective device operation parameters of at least one production device during the television production;
   a variable parameter assignment module configured to assign the first device operation property field of the macro event template as non-static, variable parameter that is modifiable during the television production to dynamically switch and set a first device operation parameter of the at least one production device;
   a parameter linking module configured to link the assigned non-static, variable parameter of the macro event template with the second device operation property field to prevent conflicts between the device operation parameters of the at least one production device during the television production; and
   a video production generator configured to generate a rundown markup interface by populating an event timeline with newsroom computer system (NRCS) data for the television production and including the macro event with the at least first and second device operation property fields for controlling the device operation parameters of the at least one production device during the television production; and
   an automated television production system that automates the television production by dynamically changing the non-static, variable parameter to switch and set the first device operation parameter of the at least one production device during the television production, and automatically modifying and setting on the fly a second device operation parameter set by the linked second device operation property field for the at least one production device to prevent conflicts between the first and second device operation parameters during the automated television production.

41. The automated television production system according to claim 40,
   wherein the template generator is further configured to create a plurality of templates for macro events that each includes the first and second device operation property fields controlling the respective device operation parameters of the at least one production device during the television production, and
   wherein the parameter linking module is configured to link the assigned non-static, variable parameter of the macro event template with each second device operation property field of each of the plurality of macro event templates to prevent conflicts between the first and second device operation parameters during the automated television production.

42. The automated television production system according to claim 41, wherein the automated television production system automatically and on the fly modifies the linked second device operation property field of each of the plurality of macro event templates during the television production to set the respective second device operation parameter of the at least one production device to prevent conflicts between the first and second device operation parameters during the automated television production.

43. The automated television production system according to claim 40, wherein the instructions when executed further provide a fixed parameter assignment module configured to assign an additional property field of the macro event template as a static, fixed operational parameter for the at least one production device that cannot be modified during the automated television production.

44. The automated television production system according to claim 40, further comprising a display configured to display during the automated television production the rundown markup interface that includes the event timeline with the macro event and a user interface for receiving a user selection of the non-static, variable parameter to switch and set the first device operation parameter of the at least one production device during the automated television production.

45. The automated television production system according to claim 40, wherein the rundown markup interface includes the NRCS data having a story running order with a plurality of stories and visually associates the template of the macro event with a respective story of the plurality of stories.

46. The automated television production system according to claim 40, wherein the first operation property field is an audio property field for designating an audio source for the at least one production device and the second operation property field is a video property field for designating a video source for the at least one production device during the automated television production.

47. A system for automated television production that automatically adjusts device control parameters to prevent conflicts between devices used during television production, the system comprising one or more processors in communication with one or more memories storing instructions that when executed provide:
   a template generator configured to create a plurality of macro events templates that each include a plurality of property fields for the device control parameters that control respective operations of at least one device used during the television production;
   a variable parameter assignment module configured to assign at least one of the plurality of property fields of a first macro event template of the plurality of macro event templates as non-static, variable parameter, such that the configured and assigned at least one property field is modifiable during the television production to dynamically adjust and set a first device control parameter of the at least one production device;

a parameter linking module configured to link the assigned non-static, variable parameter of the first macro event template with at least one corresponding property field of a second macro event template of the plurality of macro event templates, the at least one corresponding property field setting a second device control parameter of the at least one production device to prevent conflicts during the television production between the first and second control parameters of the at least one production device;

a rundown markup interface generator configured generate a rundown markup interface by populating an event timeline with newsroom computer system (NRCS) data for automated television production and including at least first and second macro event associated respectively with the first and second macro event templates; and an automated television production system configured to prevent conflicts of the first and second device control parameters of the at least one production device by changing the non-static, variable parameter of the first macro event during the television production, and automatically modifying the at least one corresponding property field of the second macro event that is linked to the non-static, variable parameter, such that the first and second device control parameters of the at least one production device are set on the fly during the television production.

48. The system for automated television production according to claim 47, wherein the instructions when executed further provide a fixed parameter assignment module configured to assign an additional property field of each of the plurality of macro events templates as static, fixed device control parameter for the at least one production device that cannot be modified during the television production.

49. The system for automated television production according to claim 47, further comprising a display configured to display during the television production the rundown markup interface that includes the event timeline with the plurality of the macro event templates and a user interface for receiving a user selection of the non-static, variable parameter of the at least one property field to switch and set the first device control parameter of the at least one production device during the television production.

50. The system for automated television production according to claim 49, wherein the user interface of the rundown markup interface displays the at least one property field as a pull-down list of a plurality of source values for the first device control parameter, and wherein the automated television production system dynamically changes and sets the first device control parameter on the fly during the television production in response to the user selecting a source value of the at least one property field using the pull-down list to designate a different source value of the plurality of source values for the first device control parameter of the at least one production device.

51. The system for automated television production according to claim 47, wherein the template generator is further configured to save the plurality of created macro event template by assigning respective images to visually represent an effect of the created macro event templates, and wherein the rundown markup interface displays the images visually representing the effect of the created macro event templates.

52. The system for automated television production according to claim 47, wherein the rundown markup interface includes the NRCS data having a story running order with a plurality of stories and visually associates the macro event templates with a respective stories of the plurality of stories.

53. The automated television production system according to claim 47, wherein the first device control parameter is an audio source for consuming audio data for the at least one production device and the second device control parameter is a video source for consuming video data for the at least one production device during the automated television production.

* * * * *